United States Patent

Hülsmann et al.

[11] Patent Number: 6,107,713
[45] Date of Patent: Aug. 22, 2000

[54] DRIVE ASSEMBLY

[75] Inventors: Ulrich Hülsmann, Ascheberg; Klaus Morawe, Dortmund; Michael Böcking, Dortmund; Martin Kunze, Dortmund, all of Germany

[73] Assignee: Leopold Kostal GmbH & Co. KG, Ludenscheid, Germany

[21] Appl. No.: 09/362,514

[22] Filed: Jul. 28, 1999

[51] Int. Cl.[7] .................................................. H02K 11/00
[52] U.S. Cl. ...................... 310/75 R; 310/68 B; 310/89; 310/112; 310/71
[58] Field of Search .................................... 310/68 B, 89, 310/67 R, 68 R, 71, 75 R, 112, 66, DIG. 3

[56] References Cited

U.S. PATENT DOCUMENTS

| | | | |
|---|---|---|---|
| 4,459,518 | 7/1984 | Chevallier | 318/286 |
| 5,245,258 | 9/1993 | Becker et al. | 318/266 |
| 5,293,125 | 3/1994 | Griffen et al. | 324/174 |
| 5,453,649 | 9/1995 | Blanchet | 310/71 |
| 5,763,970 | 6/1998 | Dunning et al. | 310/68 B |

FOREIGN PATENT DOCUMENTS 197 04 472
A1    8/1998    Germany ..................... H02K 11/00

*Primary Examiner*—Nestor Ramirez
*Assistant Examiner*—B Mullins
*Attorney, Agent, or Firm*—Brooks & Kushman P.C.

[57] ABSTRACT

A drive assembly for driving an adjustable unit in a motor vehicle includes a motor/transmission and an associated control unit. The motor/transmission is suitable for adjusting an adjustable part in a motor vehicle for normal applications. The transmission is driven by the motor to adjust the adjustable part. The motor and the transmission are separated by an interface region. The motor includes a magnetic field generator for generating an alternating magnetic field as the motor drives the transmission. The control unit can be readily connected to the motor/transmission for controlling the adjustment of the adjustable part for more advanced applications. To be readily connected to the motor/transmission, the control unit includes a profiled projection having a hollow chamber. A magnetic sensor is positioned inside the hollow chamber. The profiled projection is movable to engage the housing portion surrounding the interface region to move the control unit in an operable position with respect to the motor such that the magnetic sensor detects the magnetic fields generated by the magnetic field generator as the motor is driven for determining the position of the adjustable unit as the adjustable unit is being driven. The position of the adjustable unit is required for more complex applications.

8 Claims, 2 Drawing Sheets

DRIVE ASSEMBLY

TECHNICAL FIELD

The present invention generally relates to a drive assembly for driving an adjustable part in a motor vehicle and, more particularly, to a drive assembly having a motor/transmission suitable for adjusting the part for normal applications and a control unit readily connectable to the motor/transmission for sensing the position of the part for more advanced applications.

BACKGROUND ART

Electrically operated drive assemblies precisely adjust the position of windows, seats, sun roofs, etc., in motor vehicles while taking into consideration aspects of comfort and safety.

DE 197 04 472 A1 discloses a drive assembly having a motor/transmission combination and an associated control unit. The drive assembly has electronic components for controlling an electric motor. The drive assembly further has a control unit. The control unit has a connection configuration such as a plug-in connection part operable with an electric power supply line. The control unit has a magnetic sensor for sensing alternating polarity magnetic fields generated from a magnetic wheel located on the motor shaft end.

The problem associated prior art drive assemblies is that the means connected to the control unit for supplying power to the motor and for sensing the magnetic fields engage into the housing portion of the motor/transmission between the motor and the transmission. However, this type of engagement into the interface region separating the motor and the transmission requires the housing portion to be sealed if the drive assembly is arranged in a region of the vehicle exposed to moisture such as, e.g., a door. This arrangement has additional outlay. Furthermore, prior art drive assemblies require a unique interface structure. Thus, additional and relatively substantial outlay is required to use the motor/transmission combination without an associated control unit.

DISCLOSURE OF INVENTION

Accordingly, it is an object of the present invention to provide a drive assembly having a motor/transmission combination suitable for adjusting an adjustable part in a motor vehicle for normal applications and a control unit readily connectable to the motor/transmission for controlling the adjustment of the adjustable part for more advanced applications.

In carrying out the above object and other objects, the present invention provides a drive assembly for driving an adjustable unit in a motor vehicle. The drive assembly includes a transmission and a motor. The motor has a rotor with a shaft operable to drive the transmission. The transmission is operable to drive an adjustable unit in a motor vehicle in response to being driven by the motor. The motor has a magnetic field generator attached to the shaft for generating a magnetic field having alternating polarity as the shaft rotates. The magnetic field generator is positioned in an interface region separating the motor and the transmission.

A housing portion surrounds the interface region separating the motor and the transmission. The housing portion has an electric power connection connected to the motor. The electric power connection receives electric power from an electric power source to drive the motor thereby driving the transmission and the adjustable unit.

The drive assembly further includes a control unit having a housing laterally adjacent to the housing portion surrounding the interface region. The housing of the control unit has a profiled projection including a hollow chamber. The control unit further has a magnetic sensor positioned within the hollow chamber. The profiled projection is movable to engage the housing portion surrounding the interface region to move the control unit in an operable position with respect to the motor such that the magnetic sensor detects the magnetic fields generated by the magnetic field generator as the motor is driven for determining the position of the adjustable unit as the adjustable unit is being driven. The control unit further has an electric power connection engageable with the electric power connection of the housing portion for supplying power from an electric power source to the motor for powering the motor and driving the transmission and the adjustable unit.

The advantage of the present invention is that a relatively adaptable motor/transmission combination can be used for a plurality of applications and that additional sealing arrangement not is required when a complex control unit is being used for more advanced applications.

The above object and other objects, features, and advantages of the present invention are readily apparent from the following detailed description of the best mode for carrying out the present invention when taken in connection with the accompanying drawings.

BEST MODE FOR CARRYING OUT THE INVENTION

Figure 1:
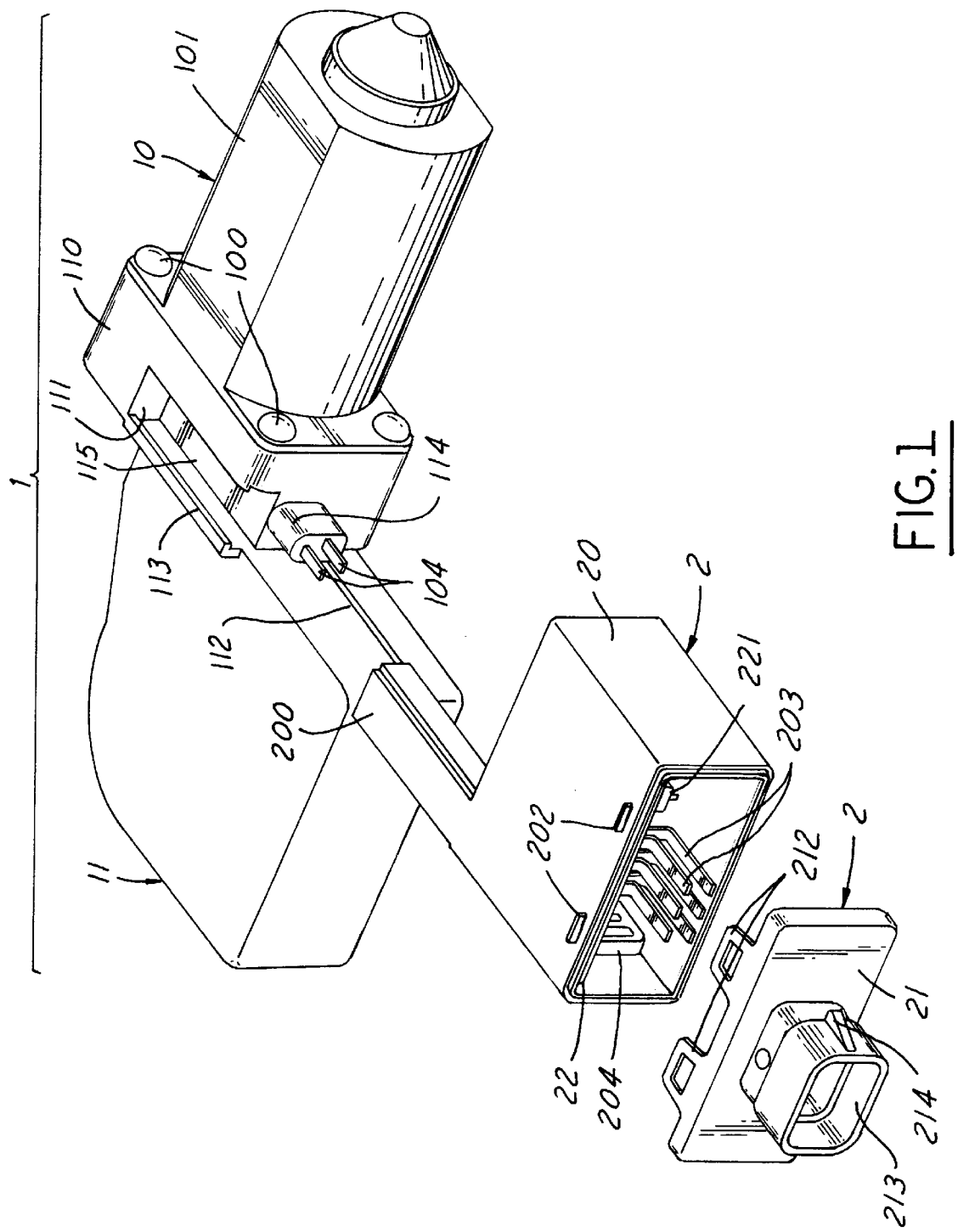
FIG. 1 illustrates an exploded, perspective view of a motor/transmission combination with an associated control unit.
Figure 2:
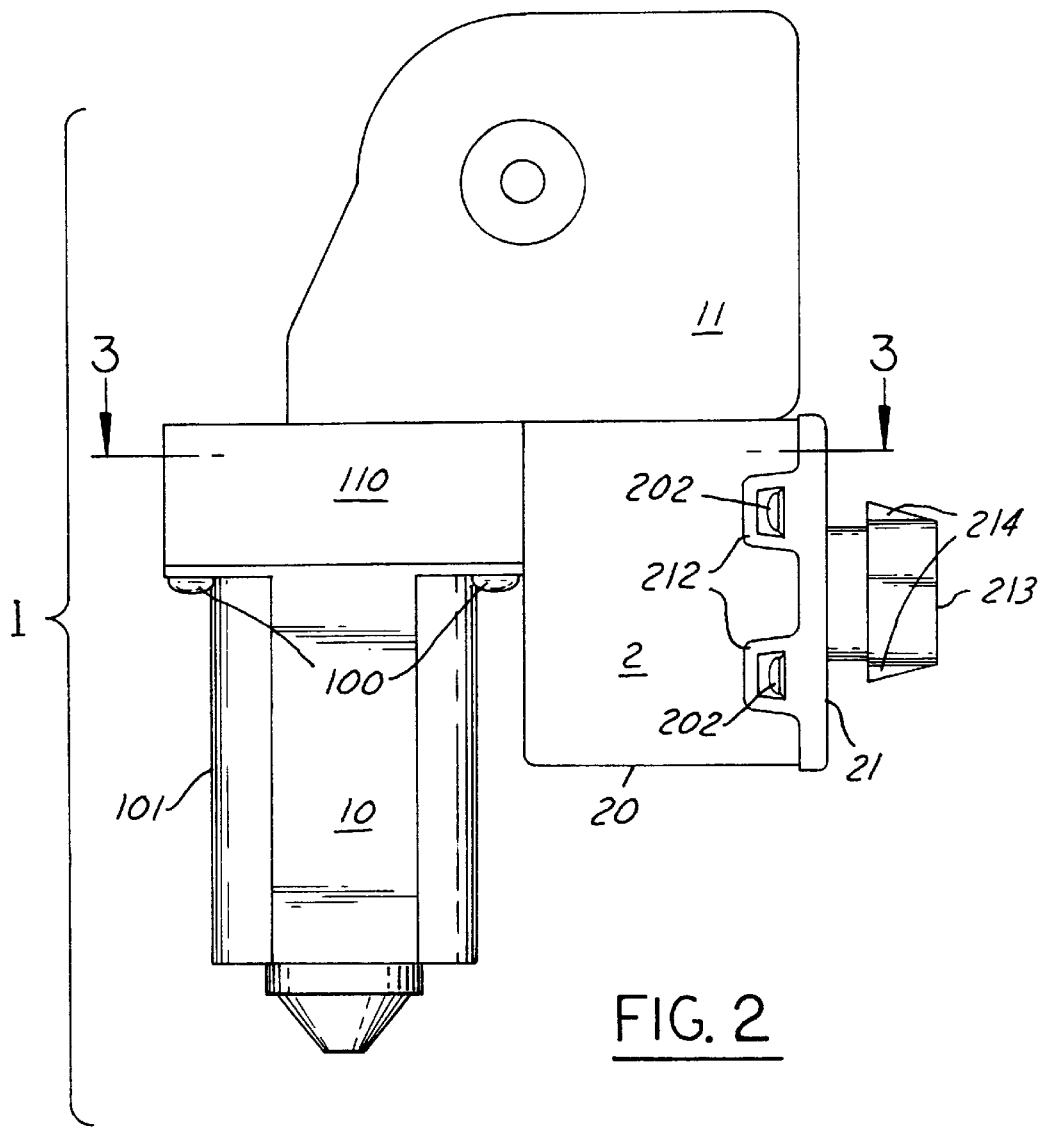
FIG. 2 illustrates a plan view of the subject matter shown in FIG. 1.
Figure 3:
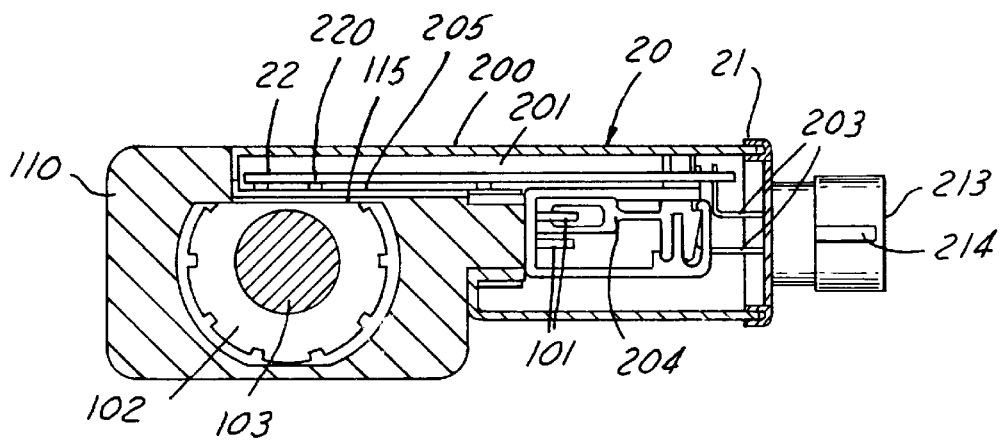
FIG. 3 illustrates a sectional view of the along the line 3—3 of FIG. 2.

Referring now to FIGS. 1–3, a drive assembly for driving an adjustable part (unit) in a motor vehicle in accordance with the present invention is shown. The drive assembly includes an electrically-operable motor/transmission combination 1. Motor/transmission combination 1 includes an electric motor 10 and a transmission 11. Motor 10 is operable with transmission 11 to drive the transmission. In response to being driven by motor 10, transmission 11 drives the adjustable unit in the motor vehicle.

A synthetic material housing surrounds motor 10 and transmission 11. Motor 10 and transmission 11 are separated by an interface region. The housing includes a housing portion 110 surrounding the interface region. Motor 10 includes a metal housing which functions as a stator 101. A rotor 102 is rotatable held inside the metal housing. Rotor 102 has a shaft end operable with transmission 11 for driving the transmission. The shaft end is located in the interface region within housing portion 110 between motor 10 and transmission 11. A magnetic wheel 103 is located within housing portion 110 and is attached to the shaft end of rotor 102 to rotate therewith. Magnetic wheel 103 generates a magnetic field having alternating polarity as it rotates with the shaft end of rotor 102 when motor 10 is driving transmission 11.

On housing portion 110, which includes the interface region between motor 10 and transmission 11, screw-like attachment means 100 hold stator 101 to the housing portion. An electric plug-in connection part 114 having plug-in contact elements 104 is attached laterally to housing portion 110. Electric plug-in connection 114 is operable for receiving electric power and providing the received electric power to motor 10.

A control unit 2 for controlling motor/transmission combination 1 includes a lower part 20 and an upper part 21. Clips 202, 212 secure upper part 21 to lower part 20. Control unit 2 includes a housing having counter plug-in contact elements 204 engageable with plug-in connection part 114. Counter plug-in contact elements 204 engage with plug-in connection part 114 for connecting motor 10 with an electric power supply.

Housing portion 110 includes a groove-like recess 111. The housing of control unit 2 includes a profiled projection 200. Pofiled projection 200 engages groove-like recess 111 to move control unit 2 in an operable position with motor 10 adjacent to the motor. Guide means 113 guide the engagement between profiled projection 200 and groove-like recess 111.

Profiled projection 200 of the housing of control unit 2 includes a hollow chamber 201. A magnetic sensor 220 is positioned within hollow chamber 201. When control unit 2 is moved adjacent to motor 10 in the operable position, i.e., when profiled projection 200 engages groove-like recess 111, magnetic sensor 220 cooperates with magnetic wheel 103. As stated, magnetic wheel 103 is positioned within housing portion 110 on the shaft end of motor 10. Magnetic sensor 220 preferably includes two Hall effect magnetic sensors mounted on a printed circuit board or substrate 22. Magnetic sensor 220 is immediately adjacent to the periphery of magnetic wheel 103 when profiled projection 200 engages groove-like recess 111. Thin non-ferromagnetic material walls 115, 205 separate magnetic sensor 220 and magnetic wheel 103 and the spacing between the magnetic sensor 220 and magnetic wheel 103 is minimal to meet required tolerances. Magnetic sensor 220 detects the magnetic fields generated by magnetic wheel 103 as motor 10 is driven for determining the position of the adjustable part as the adjustable part is being driven. Control unit 2 controls motor 10 as a function of the sensed position of the adjustable part.

Electronic components 221 are attached to printed circuit board 22. Electronic components 221 are operable with motor 10 for controlling the adjustable part. For example, assuming the adjustable unit is a window, electronic components 221 control motor 10 for providing anti-jamming or comfort control.

The conductor tracks of printed circuit board 22 are connected to connection parts. The connection parts have plug-in contact elements 203 terminating in a plug-in connection part 213. The connection parts are connected to an electric power supply line by a counter plug-in connection part. The counter plug-in connection part cooperates with the plug-in connection part. Latching means 214 secure the connection between the electric power supply line and the plug-in connection part 213.

Adjacent to the interface region of housing portion 110 between motor 10 and transmission 11, the housing surrounding the transmission has a profiled guide groove 112 extending in the direction of the course of groove-like recess 111. Profiled guide groove 112 has a corresponding guide spring (not shown). A guide spring is on the associated side of lower part 20 of the housing of control unit 2. These two mutually-cooperating guide means also have latching means which secure the housing of the control unit to motor/transmission 1 in the operable position.

If control unit 2 is not required for an application and only motor/transmission 1 is required, magnetic wheel 103 is not installed during assembly of the motor/transmission combination. In this event, a counter plug-in connection part connected to an electric power supply line directly engages plug-in connection part 114 of housing portion 110 to provide power to motor 10.

Thus it is apparent that there has been provided in accordance with the present invention, a drive assembly, that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A drive assembly for driving an adjustable unit in a motor vehicle, the drive assembly comprising:

a transmission;

a motor having a rotor with a shaft operable to drive the transmission, the transmission being operable to drive an adjustable unit in a motor vehicle in response to being driven by the motor, the motor further having a magnetic field generator attached to the shaft for generating a magnetic field having alternating polarity as the shaft rotates, the magnetic field generator positioned in an interface region separating the motor and the transmission;

a completely enclosed housing portion having an exterior surface and an interior surface, the interior surface of the housing portion surrounding the interface region which separates the motor and the transmission, the housing portion having an electric power connection connected to the motor, the electric power connection receiving electric power from an electric power source to drive the motor, thereby driving the transmission and the adjustable unit, wherein the housing portion further includes a groove-like recess on the exterior surface; and a control unit having a housing adjacent to the housing portion surrounding the interface region, the housing of the control unit having a completely enclosed profiled projection including a hollow chamber, the control unit having a magnetic sensor positioned within the hollow chamber, wherein the profiled projection is movable to be received by the groove-like recess and engage the exterior surface of the housing portion to move the control unit in an operable position with respect to the motor such that the magnetic sensor detects the magnetic fields generated by the magnetic field generator as the motor is driven for determining the position of the adjustable unit as the adjustable unit is being driven, the control unit further having an electric power connection engageable with the electric power connection of the housing portion for supplying power from an electric power source to the motor for powering the motor and driving the transmission and the adjustable unit.

2. The drive assembly of claim 1 wherein:

the profiled projection of the housing of the control unit is guided in the groove-like recess of the housing portion surrounding the interface region.

3. The drive assembly of claim 1 wherein:

the transmission includes a housing having at least one profiled guide groove adjacent to the housing portion surrounding the interface region, the at least one profiled guide groove extending in the direction of the course of the groove-like recess, wherein the at least one profiled guide groove guides the profiled projection into the groove-like recess.

4. The drive assembly of claim 1 wherein:

the housing portion surrounding the interface region has a non-ferromagnetic material wall and the housing of the control unit has a non-ferromagnetic wall, the non-ferromagnetic walls lie against each other when the profiled projection engages the housing portion surrounding the interface region such that the control unit is in the operable position with respect to the motor.

5. The drive assembly of claim 1 wherein:

the control unit further has a substrate positioned within the hollow chamber, wherein the magnetic sensor includes at least one magnetic field sensor component disposed on the substrate.

6. The drive assembly of claim 5 wherein:

the at least one magnetic field sensor component includes two Hall effect magnetic sensor components.

7. The drive assembly of claim 5 wherein:

the substrate is a printed circuit board having electrical components for controlling the motor as a function of the position of the adjustable unit.

8. The drive assembly of claim 7 wherein:

the housing of the control unit includes a lower part connected to the profiled projection, and an upper part held on to the lower part, the lower part having plug-in contact elements and the upper part having an integrally formed plug-in connection part which connects with the plug-in contact elements of the lower part to provide power from an electrical power source to the control unit and the motor.

* * * * *